United States Patent
Dingley et al.

(10) Patent No.: US 9,453,555 B2
(45) Date of Patent: Sep. 27, 2016

(54) GRIPPING APPARATUS

(71) Applicant: Doby Cleats Limited, Stanley, County Durham (GB)

(72) Inventors: Terence Raymond Dingley, Stanley (GB); Steven Ferry, Stanley (GB)

(73) Assignee: Doby Cleats Ltd, Stanley (GB)

( * ) Notice: Subject to any disclaimer, the term of this patent is extended or adjusted under 35 U.S.C. 154(b) by 107 days.

(21) Appl. No.: 14/246,922

(22) Filed: May 4, 2014

(65) Prior Publication Data

US 2015/0285337 A1    Oct. 8, 2015

(51) Int. Cl.
*F16G 11/04*    (2006.01)
*F16G 11/10*    (2006.01)
*F16M 13/02*    (2006.01)

(52) U.S. Cl.
CPC ............ *F16G 11/048* (2013.01); *F16G 11/10* (2013.01); *F16M 13/027* (2013.01); *Y10T 24/3969* (2015.01)

(58) Field of Classification Search
None
See application file for complete search history.

(56) References Cited

U.S. PATENT DOCUMENTS

| | | | | | |
|---|---|---|---|---|---|
| 593,256 | A * | 11/1897 | Velie | ........................ | F16G 11/10 188/65.2 |
| 1,139,595 | A * | 5/1915 | Starr | ........................ | F16G 11/10 211/65 |
| 1,165,785 | A * | 12/1915 | Knoche | .................... | F16G 11/10 24/136 R |
| 2,401,418 | A * | 6/1946 | Everley | .................... | F16G 11/10 403/398 |
| 6,003,210 | A * | 12/1999 | Facey | ...................... | F16G 11/04 24/130 |
| 6,345,847 | B1 * | 2/2002 | Dreisbach | ............... | F16G 11/04 292/252 |
| 8,001,660 | B2 * | 8/2011 | Cai | ......................... | F16G 11/04 24/115 H |
| 8,578,566 | B2 * | 11/2013 | Jolly | ....................... | F16G 11/04 24/136 A |
| 2003/0115723 | A1 * | 6/2003 | Shuey | ...................... | F16G 11/10 24/136 R |
| 2013/0200637 | A1 * | 8/2013 | Dreisbach | ............... | F16G 11/14 292/323 |

* cited by examiner

*Primary Examiner* — Jack W Lavinder

(57) ABSTRACT

A gripping device comprises a body having a longitudinal axis and including at least one elongate opening for receiving an elongate element, a gripping element, and means for bringing the gripping element into engagement with an elongate element located in the said opening, wherein the gripping element is mounted for translational movement in a slot having a longitudinal axis, and the longitudinal axis of the slot is set at an acute angle to the longitudinal axis of the opening, and wherein a force component exerted on an elongate element located in the said opening causes the gripping element to move in the slot and towards the elongate element, and wherein said opening is defined by walls and wherein one of the walls includes two intersecting surfaces lying at an angle to one another, the angle between the two surfaces being concave.

12 Claims, 2 Drawing Sheets

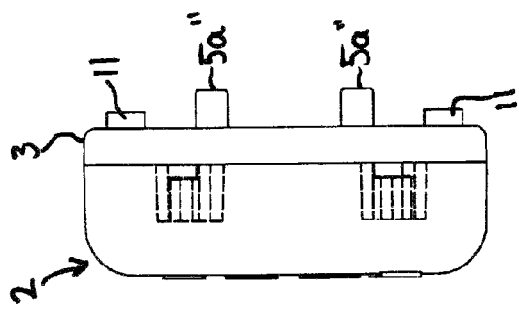
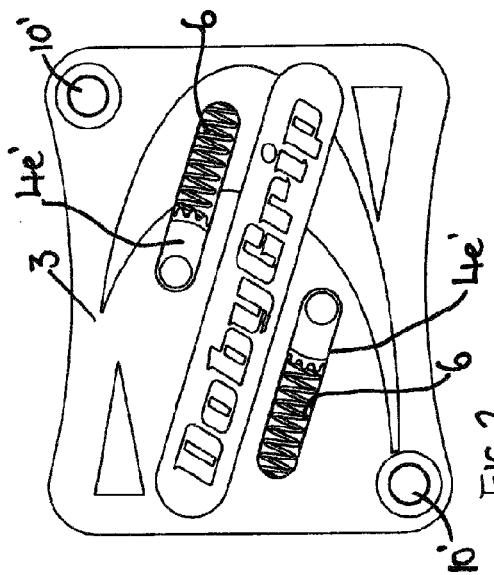
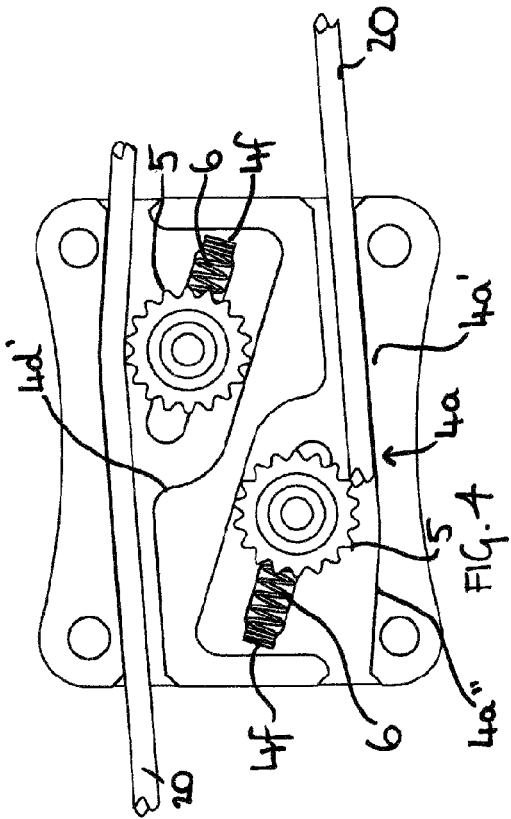
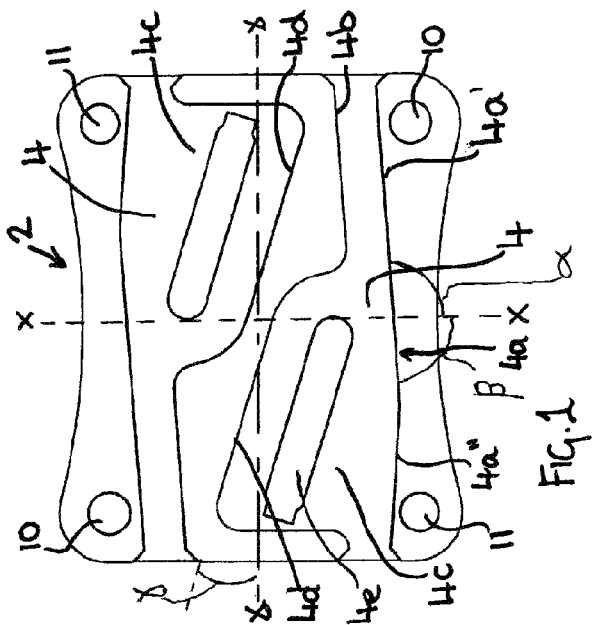
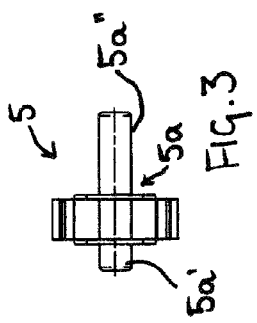

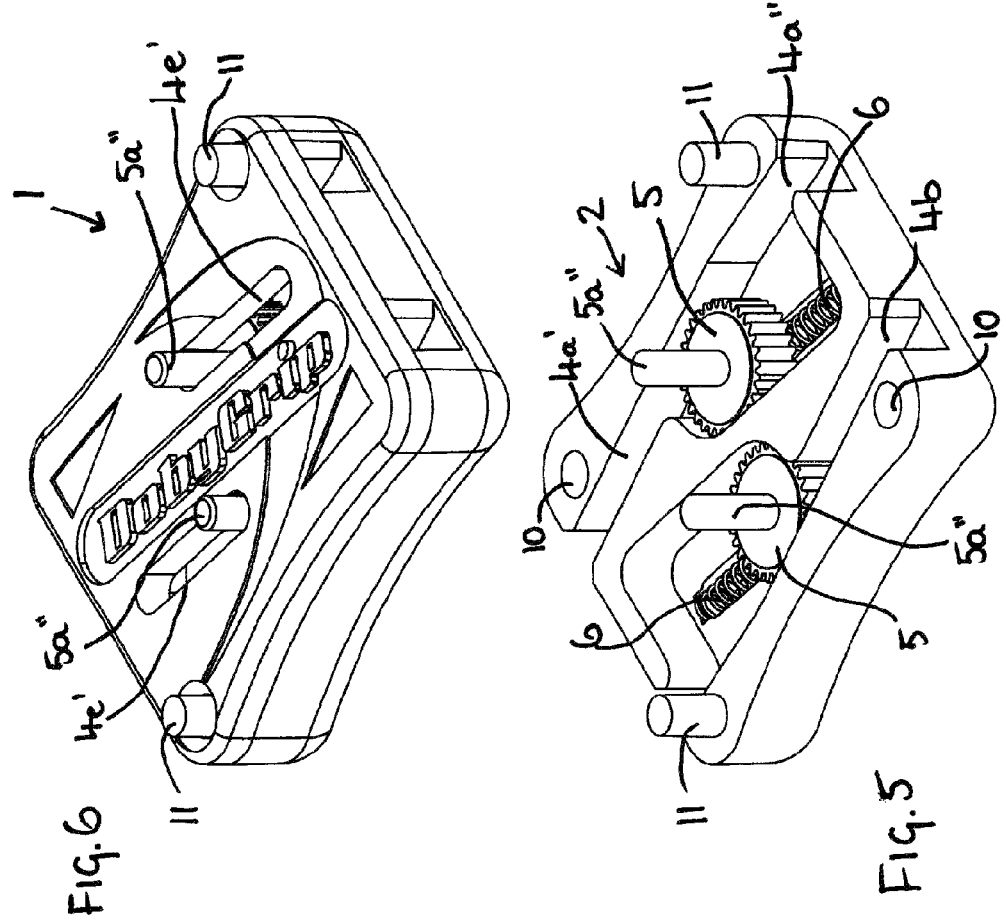

GRIPPING APPARATUS

FIELD OF THE INVENTION

The present invention relates to a gripping device, and in particular to a device for gripping an elongate strand of material such as a wire.

BACKGROUND OF THE INVENTION

Gripping devices are used in many applications. For example, joining together wire strands in fencing applications, to suspend an object from a wire, to suspend sports equipment, or to suspend objects from structural elements of a building.

Gripping devices are known from the patent documents referred to below:

GB 2210517, WO 95/30844 and WO 97/36123 describe examples of wire gripping devices in which toothed wedges grip the wire.

GB2240581 describes a gripping device of the type described in the above-mentioned patents where the toothed wedges are replaced by ribbed wheels.

WO 92/12766 describes a gripping device for gripping a cord which supports a ball.

One problem associated with the known gripping devices is that when placed under excess load, or if the gripping device is defective, the gripped elongate element can pull through the gripping device. Obviously, this is undesirable and could have disastrous consequences.

Another problem associated with the known gripping device is that they are difficult to adjust.

The afore-mentioned problems were addressed in the applicants United Kingdom patent no 2430234.

It is in the nature of gripping devices of the type described above that an increasing force on the wire passing therethrough increases the gripping force of the device on the wire. However, it is also in the nature of this type of gripping device that the element which engages the wire to lock it with respect to the device causes the wire to deform. It can therefore arise that the wire has been subjected to such force that the gripping device has flattened the wire to an extent that it is not possible for the gripping element of the device to penetrate the surface of the wire sufficiently to support the force applied. This can cause the wire to release from the gripping device.

There is a demand to use the types of gripping device described above with heavier loads.

It would therefore be desirable to provide such a gripping device. It is an aim of the present invention to provide such a device.

SUMMARY OF THE INVENTION

According to the invention there is provided a gripping device comprising body having a longitudinal axis and including at least one elongate opening for receiving an elongate element, a gripping element, and means for bringing the gripping element into engagement with an elongate element located in the said opening, wherein the gripping element is mounted for translational movement in a slot having a longitudinal axis, and the longitudinal axis of the slot is set at an acute angle to the longitudinal axis of the opening, and wherein a force component exerted on an elongate element located in the said opening causes the gripping element to move in the slot and towards the elongate element, and wherein said opening is defined by walls and wherein one of the walls includes two intersecting surfaces lying at an angle to one another, the angle between the two surfaces being concave.

Preferably, the angle between the two surfaces lies in the range 160 to 179 degrees.

Preferably, one of the surfaces lies at an angle in the range 1 to 10 degrees with respect to a longitudinal axis of the body.

Preferably, both of the surfaces lie in the range 91 to 100 degrees with respect to an axis perpendicular to the longitudinal axis of the body.

Preferably, one of the surfaces lies at an angle in the range 3 to 8 degrees with respect to the longitudinal axis of the body.

Preferably, the other of the surfaces lies at an angle in the range 1 to 10 degrees with respect to the longitudinal axis of the body.

Advantageously, the slot has ends and the surfaces intersect at a position aligned between the ends of the slot.

The gripping element is advantageously a pinion wheel.

Advantageously, a surface of the opening provides a track, the pinion wheel engaging with the track.

Preferably, the pinion wheel is one of: smooth, toothed and roughened.

Advantageously, the track is one of: smooth, roughened and toothed.

The gripping device may further comprise biasing means arranged to bias the pinion into the path of the elongate opening.

The biasing means may be a spring, which spring may be a compression spring.

In the gripping device of the invention the gripping element pushes an elongate element therein against an opposing wall. By providing for the wall with surfaces inclined to one another the wire is caused to bend slightly. This is sufficient to increase the surface area available for engagement with the gripping element. The gripping element of the invention is therefore better able to support heavy loads.

BRIEF DESCRIPTION OF THE DRAWINGS

In the drawings, which illustrate a preferred embodiment of the invention, and are by way of example:

FIG. 1 is plan view of a first part of a two part body of a gripping device of the invention;

FIG. 2 is a plan view of a second part of the two part body of the gripping device of the invention;

FIG. 3 is an end view of the pinion wheel of the gripping device of the invention;

FIG. 4 is a plan view of the first part of an assembled gripping device illustrated in FIG. 1 in use;

FIG. 5 is an isometric representation of the first part of the assembled two part gripping device shown in FIG. 4 prior to introduction of elongate elements;

FIG. 6 is an isometric representation of the assembled gripping device of the invention;

FIG. 7 is an end view of the assembled gripping device illustrated in FIG. 6.

DETAILED DESCRIPTION OF THE PREFERRED EMBODIMENTS

Referring now to FIG. 1, the gripping device 1 comprises a body 2 and a top plate 3. The body 2 includes a pair of spaced apart openings 4 that extend through the body 2 from the front to the back of the device. Each opening 4 has a first side 4a and a second side 4b including a recess 4c. The recess 4c includes a track 4d. Within the boundary of each recess 4c and located in the body 2 a slot 4e is provided which is aligned with a corresponding slot 4e' in the top plate 3. A toothed pinion wheel 5 is mounted on a pin 5a having ends 5a' and 5a". The end 5a' of the pin 5a locates in the slot 4e, the end 5a" extending through the slot 4e' and providing a means by which the position of the pinion 5 may be manually adjusted. The shape of the aligned slots 4e, 4e' define a path in which the pin 5a travels. The slots 4e, 4e' are positioned and oriented such that the teeth of the pinion wheel 5 engage with the track 4d of the recess 4c, the ends of the slots 4e, 4e' defining the extreme positions of the pinion wheel. The slots 4e, 4e' lie substantially parallel with the track 4d, which is set and angle y to the longitudinal axis X-X of the body 2.

The side 4a of the opening 4 includes two surfaces 4a' and 4a". The surfaces 4a', 4a" intersect and lie at an angle to one another, preferably between 160 and 179 degrees. A wire 20, as shown in FIG. 4, may be introduced into the part of the opening including surface 4a' so as to exit through the opening through the part including surface 4a". Using this method, the end of the wire 20 pushes the pinion wheel 5 so that it travels along the path of the slot 4e', thereby allowing space for the wire to pass the pinion wheel and exit through the opening 4a". When the wire 20 is pulled in the opposite direction the spring 6 pushes the pinion wheel against the surface of the wire 20 so that the teeth of the pinion wheel 5 grip the surface of the wire 20 causing the wire to abut firmly against the surfaces 4a', 4a".

In the embodiment illustrated the surface 4a' lies at an angle a to an axis Y-Y lying perpendicular to the longitudinal axis of the device, the angle α being 94 degrees.

In this embodiment the surface 4a" lies at an angle β to the axis Y-Y, which in the illustrated embodiment is also 94 degrees.

The aforementioned angle need not be 94 degrees but the combination of the angles at which the surfaces 4a', 4a" lie must to be sufficient to cause an elongate element inserted through the opening 4 to bend as it passes around the pinion 5. Conversely, the combination of angles must not be so great as to limit the ability of the elongate element to be fed through the opening 4 from one end thereof. These two factors set the limits of the range of angles at which the surfaces 4a, 4a" may lie.

One of the surfaces and preferably each of the surfaces 4a' and 4a" lie on an angle of between 91 and 100 degrees to the axis Y-Y. It is not essential that each surface 4a', 4a" should lie on the same angle. For example, the part 4a' may lie on a shallower angle than the part 4a" or vice versa. It is preferred that both angles lying within the range 91 to 100 degrees to the axis Y-Y, but one of the surfaces may lie outside the range, for example at 90 degrees to the axis Y-Y. What is essential is that the surfaces 4a' and 4a" lie at an angle to one another, thereby causing an elongate element passing through the opening to bend slightly.

The effect of such slight bending of the the elongate element is to increase the surface area thereof that is available for engagement with the pinion wheel 5.

The body 2 includes a wall 4f forming one of the boundaries to the recess 4c. When assembled a compression spring sits partially in the slot 4e, its opposing ends engaging the wall 4f and the part 5a" of the pin 5a of pinion wheel 5. The spring 6 biases the pinion wheel 5 to a closed position, i.e. the position occupied by the pinion wheel in FIG. 5.

In this example, the body 2 and top cover 3 are each formed of pressed steel. The body 2 includes holes 10 which align with correspondingly threaded holes (not shown) in the top cover 3. A screw is passed through the aligned holes to secure the body 2 and top cover 3 together. The body 2 also includes location pins 11 which align with bores 10' in the top cover. The dimensions of the said bores and location pins are such that one is a press fit into the other.

The track 4d also includes a curved portion $4d^1$, the curve extending from one side of the opening 4 to the end of the substantially straight part of the track 4d. The action of the curve is to move the pinion wheel 5 towards the surface 4a' more rapidly over a unit of distance that is the case for the substantially straight part of the rack 4d. This movement of the pinion wheel 5 more rapidly towards the surface 4a' is provided for within the play between the pin 5a and the slots 4e, 4e'. The provision of the curve portion $4d^1$ allows the gripping device of the invention to be used with a wide range of cross-sections of elongate elements. Nevertheless, the dimensions of the gripping device may be optimised to match particular cross-sectional dimensions of elongate elements.

The track 4d may be smooth, roughened or toothed. In the illustrated embodiments, the track 4d is smooth.

We claim:

1. A gripping device comprising a body having a longitudinal axis and including at least one elongate opening for receiving an elongate element, the elongate opening having a longitudinal axis, a gripping element, and means for bringing the gripping element into engagement with an elongate element located in said at least one elongate opening, wherein the gripping element is mounted for translational movement in a slot having a longitudinal axis, and the longitudinal axis of the slot is set at an acute angle to the longitudinal axis of said at least one elongate opening, and wherein a force component exerted on an elongate element located in the said at least one elongate opening causes the gripping element to move in the slot and towards the elongate element, and wherein said at least one elongate opening is defined by walls and wherein one of the walls includes two intersecting surfaces lying at an angle to one another, the angle formed between the two surfaces lies in the range 160 to 179 degrees, and wherein said slot has ends and the intersecting surfaces intersect at a position aligned between the ends of the slot.

2. A gripping device according to claim 1, wherein one of the surfaces lies at an angle in the range 1 to 10 degrees with respect to a longitudinal axis of the body.

3. A gripping device according to claim 2, wherein both of the surfaces lie in the range 91 to 100 degrees with respect to an axis perpendicular to the longitudinal axis of the body.

4. A gripping device according to claim 1, wherein one of the surfaces lies at an angle in the range 3 to 8 degrees with respect to the longitudinal axis of the body.

5. A gripping device according to claim 4, wherein the other of the surfaces lies at an angle in the range 1 to 10 degrees with respect to the longitudinal axis of the body.

6. A gripping device according to claim 1, wherein the gripping element is a pinion wheel.

7. A gripping device according to claim 6, wherein a surface of the at least one elongate opening provides a track, the pinion wheel engaging with the track.

8. A gripping device according to claim 7, wherein the track is one of:
   smooth, roughened and toothed.

9. A gripping device according to claim 6, wherein the pinion wheel is one of: smooth, toothed and roughened.

10. A gripping device according to any claim 1, further comprising biasing means arranged to bias the pinion along the longitudinal axis of the at least one elongate opening.

11. A gripping device according to claim 10, wherein the biasing means is a spring.

12. A gripping device according to claim 11, wherein the spring is a compression spring.

* * * * *